(12) United States Patent
The et al.

(10) Patent No.: US 9,607,440 B1
(45) Date of Patent: *Mar. 28, 2017

(54) COMPOSITE IMAGE ASSOCIATED WITH A HEAD-MOUNTABLE DEVICE

(71) Applicant: Google Inc., Mountain View, CA (US)

(72) Inventors: Richard The, New York, NY (US); Max Benjamin Braun, San Francisco, CA (US); Chris McKenzie, Mountain View, CA (US); Alexander Hanbing Chen, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/258,960

(22) Filed: Sep. 7, 2016

Related U.S. Application Data

(63) Continuation of application No. 14/073,684, filed on Nov. 6, 2013, now Pat. No. 9,466,150.

(51) Int. Cl.
*G06T 19/00* (2011.01)
*H04N 7/18* (2006.01)
*G02B 27/01* (2006.01)

(52) U.S. Cl.
CPC ........ *G06T 19/006* (2013.01); *G02B 27/0172* (2013.01); *H04N 7/188* (2013.01); *G02B 2027/014* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | |
|---|---|---|
| 5,162,828 A | 11/1992 | Furness et al. |
| 6,037,914 A | 3/2000 | Robinson |
| 6,046,712 A | 4/2000 | Beller et al. |
| 6,195,206 B1 | 2/2001 | Yona et al. |
| 6,456,438 B1 | 9/2002 | Lee et al. |
| 8,902,254 B1 | 12/2014 | Laughlin et al. |
| 2006/0170652 A1 | 8/2006 | Bannai et al. |
| 2006/0227151 A1 | 10/2006 | Bannai |
| 2010/0231705 A1 | 9/2010 | Yahav et al. |
| 2012/0184252 A1 | 7/2012 | Hirsch |
| 2012/0299950 A1 | 11/2012 | Ali et al. |
| 2013/0141421 A1 | 6/2013 | Mount et al. |
| 2013/0147686 A1 | 6/2013 | Clavin et al. |
| 2013/0286004 A1 | 10/2013 | McCulloch et al. |
| 2014/0225918 A1 | 8/2014 | Mittal et al. |
| 2015/0049001 A1 | 2/2015 | Rahman et al. |

FOREIGN PATENT DOCUMENTS

EP    2221654    8/2010

*Primary Examiner* — Ryan D McCulley
(74) *Attorney, Agent, or Firm* — McDonnell Boehnen Hulbert & Berghoff LLP (57) ABSTRACT

In one aspect, an HMD is disclosed that provides a technique for generating a composite image representing the view of a wearer of the HMD. The HMD may include a display and a front-facing camera, and may be configured to perform certain functions. For instance, the HMD may be configured to make a determination that a trigger event occurred and responsively both generate a first image that is indicative of content displayed on the display, and cause the camera to capture a second image that is indicative of a real-world field-of-view associated with the HMD. Further, the HMD may be configured to generate a composite image that combines the generated first image and the captured second image.

20 Claims, 8 Drawing Sheets

COMPOSITE IMAGE ASSOCIATED WITH A HEAD-MOUNTABLE DEVICE

RELATED DISCLOSURES

This disclosure is a continuation of U.S. patent application Ser. No. 14/073,684, entitled "Composite Image Associated with a Head-Mountable Device," filed on Nov. 6, 2013, which is hereby incorporated by reference herein in its entirety.

BACKGROUND

Unless otherwise indicated herein, the materials described in this section are not prior art to the claims in this disclosure and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that may be worn by a user. A user wearing a wearable display may be referred to as a "wearer." A wearable display may place a very small image display element close enough to a wearer's eye(s) such that the displayed image fills or nearly fills the field of view, and appears as a normal sized image, such as might be displayed on a traditional image display device. The relevant technology may be referred to as "near-eye displays."

A near-eye display is a fundamental component of a wearable display, also sometimes called a head-mountable display or a head-mountable device (HMD). A HMD places a graphic display or displays close to one or both eyes of a wearer. To generate the images on a display, a computer processing system may be used. Such displays may occupy a wearer's entire field of view, or only occupy part of a wearer's field of view.

SUMMARY

In one aspect, an HMD is disclosed that is operable to generate a composite image representing the view of a wearer of the HMD. The HMD may include a display and a front-facing camera, and may be configured to perform certain functions. For instance, the HMD may be configured to make a determination that a trigger event occurred and responsively both generate a first image that is indicative of content displayed on the display, and cause the camera to capture a second image that is indicative of a real-world field-of-view associated with the HMD. Further, the HMD may be configured to generate a composite image that combines the generated first image and the captured second image.

In another aspect, a method involves: (i) making, by a computing device, a determination that a trigger event occurred; (ii) responsive to making the determination that the trigger event occurred, (a) generating, by the computing device, a first image that is indicative of content displayed on a display of an HMD, and (b) causing, by the computing device, a camera to capture a second image that is indicative of a real-world field-of-view associated with the HMD; and (iii) generating, by the computing device, a composite image that combines the generated first image and the captured second image.

In another aspect, an HMD includes a display, a camera positioned for capturing a real-world field-of-view associated with the HMD, a processor, and a non-transitory computer-readable medium including program instructions that, when executed by the processor, cause performance of a functions including: (i) making a determination that a trigger event occurred; (ii) responsive to making the determination that the trigger event occurred, generating a first image that is indicative of content displayed on the display, and causing the camera to capture a second image that is indicative of the real-world field-of-view; and (iii) generating a composite image that combines the generated first image and the captured second image.

In another aspect, a method involves: (i) making, by a computing device, a determination that a trigger event occurred; (ii) responsive to making the determination that the trigger event occurred, (a) generating, by the computing device, a first video that is indicative of content displayed on a display of an HMD, and (b) causing, by the computing device, a camera to capture a second video that is indicative of a real-world field-of-view associated with the HMD; and (iii) generating, by the computing device, a composite video that combines the generated first image and the captured second image.

In yet another aspect, disclosed are means for: (i) making, by a computing device, a determination that a trigger event occurred; (ii) responsive to making the determination that the trigger event occurred, (a) generating, by the computing device, a first image that is indicative of content displayed on a display of an HMD, and (b) causing, by the computing device, a camera to capture a second image that is indicative of a real-world field-of-view associated with the HMD; and (iii) generating, by the computing device, a composite image that combines the generated first image and the captured second image.

In still aspect, disclosed are means for: (i) making, by a computing device, a determination that a trigger event occurred; (ii) responsive to making the determination that the trigger event occurred, (a) generating, by the computing device, a first video that is indicative of content displayed on a display of an HMD, and (b) causing, by the computing device, a camera to capture a second video that is indicative of a real-world field-of-view associated with the HMD; and (iii) generating, by the computing device, a composite video that combines the generated first image and the captured second image.

These as well as other aspects, advantages, and alternatives, will become apparent to those of ordinary skill in the art by reading the following detailed description, with reference where appropriate to the accompanying drawings.

DETAILED DESCRIPTION

Exemplary systems and methods are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

I. Overview

As noted above, a display of an HMD may occupy some or all of a wearer's field of view. In some instances, the display may be transparent or semi-transparent and may be positioned such that a wearer of the HMD may view images or video on the display together with a "real world" background behind the display. In other instances, the display may be opaque but may be positioned such that a wearer of the HMD may view images of video on the display together with the real world background around the display (i.e., portions of the real world background that are not blocked by the display). In any of these instances, a wearer may wish to record the wearer's view and/or share this view with others.

To do so, the wearer may cause the HMD to generate a first image, which may be a "screenshot" of the display (such as by uttering a suitable voice command that can be processed by a speech recognition module (SRM) of the HMD). In addition, the wearer may use a camera to capture a second image indicative of the "real world" field-of-view of the HMD wearer (such as by uttering another voice command that can be processed by the SRM). Then, with the assistance of photo-editing feature, the HMD may allow the wearer to overlay the first image on the second image to generate a composite image.

However, for a variety of reasons, the generated composite image may not properly reflect the wearer's view as desired. For example, there may be some delay between the time that the first image is generated and the time that the second image is captured, such as due to the delay in the SRM processing the two voice commands. As such, the composite image may not properly reflect the wearer's view at the desired moment. As another example, the wearer may find it difficult to capture the appropriate portion of the real world, that is, the portion that the wearer is/was seeing through the display at the time when the HMD generated the first image. Again, as a result the composite image may not properly reflect the wearer's view at the desired moment.

The disclosed system and method helps address these issues by providing an improved technique for generating an image associated with an HMD. In one example, the disclosed system takes the form of an HMD that includes a display and a front-facing camera. The camera may be positioned such that it may capture a real-world field-of-view associated with the HMD. The HMD may further include a processor and a non-transitory computer-readable medium including program instructions that, when executed by the processor, cause performance of certain functions.

For instance, the HMD may be configured to make a determination that a trigger event occurred and responsively both generate a first image that is indicative of content displayed on the display, and cause the camera to capture a second image that is indicative of a real-world field-of-view associated with the HMD. Further, the HMD may be configured to generate a composite image that combines the generated first image and the captured second image.

By utilizing a front-facing camera on the HMD to capture the second image, the second image may be substantially the same as real-world field-of-view that the wearer sees though the display. In addition, by both generating the first image and capturing the second image in response to the HMD making a determination that a trigger event occurs, the HMD may control the timing of these two functions. In one example, the HMD may be configured to perform these functions substantially simultaneously such that the generated composite image represents the view of a wearer of the HMD at a particular time.

In an alternative embodiment, an HMD is configured for generating and capturing video (which may or may not include an audio portion), rather than an image. As such, the HMD may be configured to make a determination that a trigger event occurred and responsively both generate a first video that is indicative of content displayed on the display, and cause the camera to capture a second video that is indicative of a real-world field-of-view associated with the HMD. Further, the HMD may be configured to generate a composite video that combines the generated first video and the captured second video.

II. Exemplary Systems

Systems in which exemplary embodiments may be implemented will now be described in greater detail. In general, an exemplary system may be implemented in or may take the form of a wearable computer. However, an exemplary system may also be implemented in or take the form of other devices, such as a mobile phone, among others. Further, an exemplary system may take the form of non-transitory computer readable medium, which has program instructions stored thereon that are executable by at a processor to provide the functionality described herein. An exemplary system may also take the form of a device such as a wearable computer or mobile phone, or a subsystem of such a device, which includes such a non-transitory computer readable medium having such program instructions stored thereon.

Figure 1A:
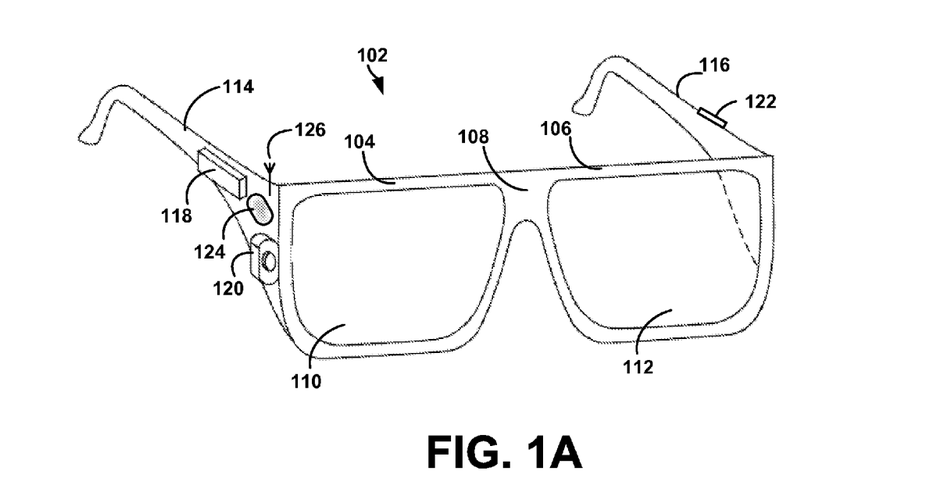
FIG. 1A illustrates a wearable computing system according to an exemplary embodiment.

FIG. 1A illustrates a wearable computing system according to an exemplary embodiment. In FIG. 1A, the wearable computing system takes the form of an HMD 102. It should be understood, however, that exemplary systems and devices may take the form of or be implemented within or in association with other types of devices, without departing from the scope of the invention. Further, unless specifically noted, it will be understood that the systems, devices, and methods disclosed herein are not functionally limited by whether or not the HMD 102 is being worn. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a wearer's face via a wearer's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a wearer to see through the lens element. Combining these two features of the lens elements may facilitate an augmented reality or heads-up display where the projected image or graphic is superimposed over a real-world view as perceived by the wearer through the lens elements 110, 112. Alternatively, a portion of the lens elements 110, 112 may be opaque but may be positioned such that a wearer of the HMD may view images of video on the lens elements 110, 112 together with the real world background around the lens elements 110, 112 (i.e., portions of the real world background that are not blocked by the lens elements 110, 112)

The extending side-arms 114, 116 may each be projections that extend away from the lens-frames 104, 106, respectively, and may be positioned behind a wearer's ears to secure the HMD 102 to the wearer. The extending side-arms 114, 116 may further secure the HMD 102 to the wearer by extending around a rear portion of the wearer's head. Additionally or alternatively, for example, the HMD 102 may connect to or be affixed within a head-mountable helmet structure. Other possibilities exist as well.

The HMD 102 may also include an on-board computing system 118, a still image and/or video camera 120, a sensor 122, and a user interface 124, and a communication interface 126. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example.

The processor may include one or more general purpose processors (e.g., microprocessors) and/or one or more special purpose processors (e.g., digital signal processors (DSPs)). The memory may include one or more volatile and/or non-volatile storage components, such as magnetic, optical, flash, or organic storage, and may be integrated in whole or in part with the processor.

Generally, the processor may be configured to execute program instructions (e.g., compiled or non-compiled program logic and/or machine code) stored in the memory to perform one or more of the functions described herein and/or shown in the accompanying drawings. As such, the memory may take the form of a non-transitory computer-readable storage medium, having stored thereon program instructions that, upon execution by the processor, cause the HMD 102 to perform one or more of the functions described herein and/or shown in the accompanying drawings.

The on-board computing system 118 may be configured to send, receive, and/or analyze data from the camera 120, the user interface 124, the communication interface 126 (and possibly from other sensory devices, user interfaces, or both), and generate images for output by the lens elements 110 and 112.

The camera 120 is shown positioned on the extending side-arm 114 of the HMD 102; however, the camera 120 may be provided on other parts of the HMD 102. The camera 120 may be configured to capture images or video at various resolutions or at different frame rates. Many cameras with a small form-factor, such as those used in cell phones or webcams, for example, may be incorporated into an example of the HMD 102.

The camera 120 may be forward facing to capture at least a portion of the real-world view perceived by the wearer. This forward facing image captured by the camera 120 may then be used to generate an augmented reality where computer generated images appear to interact with the real-world view perceived by the wearer. In addition, this captured image may be used to generate a composite image representing the wearer's view as described in greater detail below. Further, although FIG. 1A illustrates one camera 120, more cameras may be used, and each may be configured to capture the same view, or to capture different views. For example, a camera may be facing the wearer's eye(s) and be used to sense a user's eye movements and/or positioning. The use of such eye-sensing technology may provide a particular benefit in connection with generating a composite image as described in greater detail below.

The sensor 122 is shown on the extending side-arm 116 of the HMD 102; however, the sensor 122 may be positioned on other parts of the HMD 102. The sensor 122 may include one or more of a gyroscope, an accelerometer, or a temperature sensor, for example. Other sensing devices may be included within, or in addition to, the sensor 122 or other sensing functions may be performed by the sensor 122.

The user interface 124 may function to allow the device 200 to interact with a user (e.g., a wearer), such as to receive input from a user and to provide output to the user. Thus, the user interface 124 may include input components such as a microphone, a button or a finger-operable touch pad, or output components such as a speaker. The user-interface 124 is shown on the extending side-arm 114 of the HMD 102. However, the user interface 124 may be positioned on other parts of the HMD 102.

As noted above, the user-interface may include a finger-operable touch pad, which may be used by a user to input commands. The finger-operable touch pad may sense at least one of a position and a movement of a finger via capacitive sensing, resistance sensing, or a surface acoustic wave process, among other possibilities. The finger-operable touch pad may be capable of sensing finger movement in a direction parallel or planar to the pad surface, in a direction normal to the pad surface, or both, and may also be capable of sensing a level of pressure applied to the pad surface. The finger-operable touch pad may be formed of one or more translucent or transparent insulating layers and one or more translucent or transparent conducting layers. Edges of the finger-operable touch pad may be formed to have a raised, indented, or roughened surface, so as to provide tactile feedback to a user when the user's finger reaches the edge, or other area, of the finger-operable touch pad. If more than one finger-operable touch pad is present, each finger-operable touch pad may be operated independently, and may provide a different function.

The computing system 118, the user interface 124, and/or one or more other components, such as those described here, may be used to determine whether a particular event has occurred (which the HMD 102 may use as a trigger event for performing a corresponding function). For instance, the computing system 118 and one or both of the camera 180 and the finger-operable touchpad may function together to determine whether a user has made a particular gesture. As another example, the computing device 118 (or more particularly, an SRM of the computing device 118) and a microphone may function to determine whether a user has uttered a particular voice command. Still further, the computing device 118 and a button may function together to determine whether a user has pressed the button. Other ways to determine whether an event has occurred may also be used.

The communication interface 126 is shown on the extending side-arm 114 of the HMD 102; however, the communication interface 126 may be positioned on other parts of the HMD 102. The communication interface 126 functions to allow the HMD 102 to communicate, using analog or digital modulation, with other devices, access networks, and/or transport networks. For example, a communication interface may take the form of a wired interface, such as an Ethernet, Token Ring, or USB port. As another example, a communication interface may take the form of a wireless interface, such as a Wifi, BLUETOOTH®, global positioning system (GPS), or a wide-area wireless (e.g., WiMAX or LTE) interface.

Figure 1B:
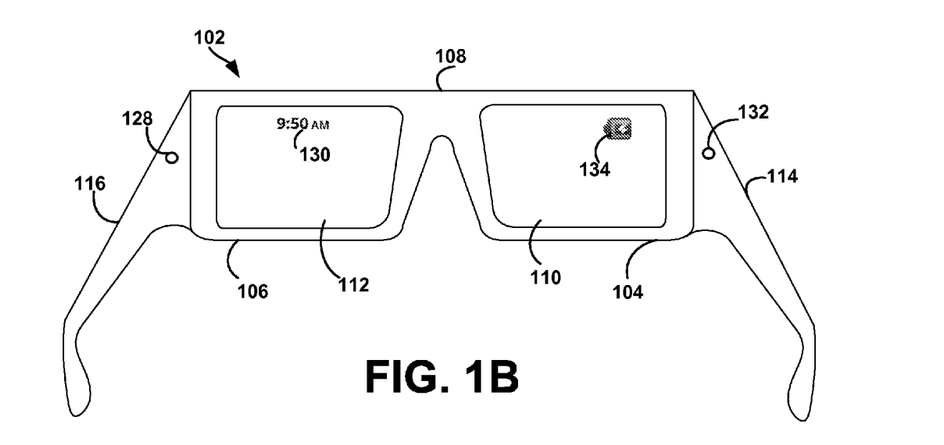
FIG. 1B illustrates an alternate view of the wearable computing device illustrated in FIG. 1A.

FIG. 1B illustrates an alternate view of the HMD 102. As shown in FIG. 1B, the lens elements 110, 112 may act as displays. The HMD 102 may include a first projector 128 coupled to an inside surface of the extending side-arm 116 and configured to project content 130 onto an inside surface of the lens element 112. Additionally or alternatively, a second projector 132 may be coupled to an inside surface of the extending side-arm 114 and configured to project additional content 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of displays may also be used. For example, the lens elements 110, 112 themselves may include: a transparent or semi-transparent matrix display, such as an electroluminescent display or a liquid crystal display, one or more waveguides for delivering an image to the wearer's eyes, or other optical elements capable of delivering an in focus near-to-eye image to the wearer. A corresponding display driver may be disposed within the frame elements 104, 106 for driving such a matrix display. Alternatively or additionally, a laser or LED source and scanning system could be used to draw a raster display directly onto the retina of one or more of the wearer's eyes. Other possibilities exist as well.

Figure 1C:
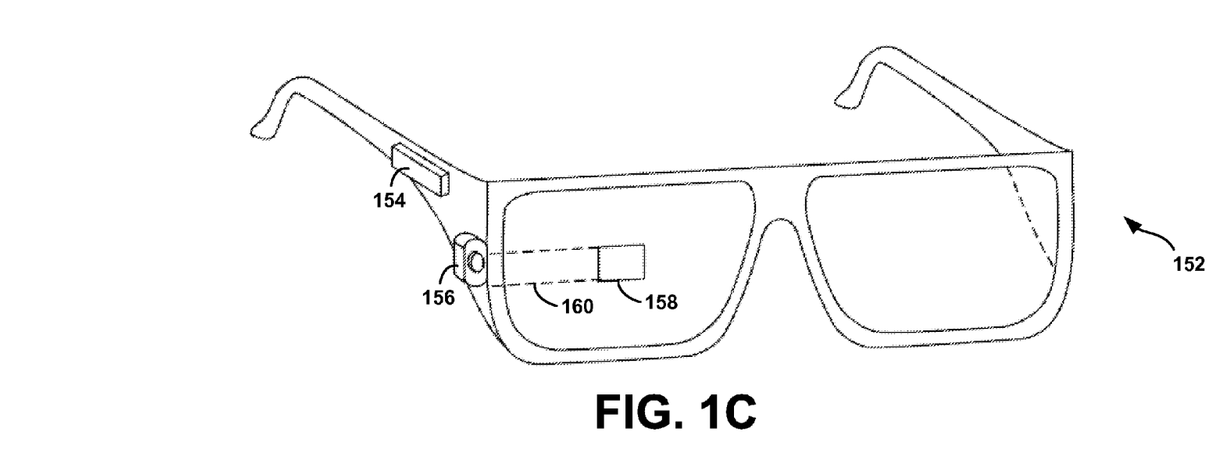
FIG. 1C illustrates another wearable computing system according to an exemplary embodiment.

FIG. 1C illustrates another wearable computing system according to an exemplary embodiment, which takes the form of an HMD 152. The HMD 152 may include frame elements and side-arms such as those described with respect to FIGS. 1A and 1B. The HMD 152 may additionally include an on-board computing system 154 and a camera 156, such as those described with respect to FIGS. 1A and 1B. The on-board computing system 154 and the camera 156 are shown mounted on a frame of the HMD 152. However, the camera 156 and the on-board computing system 154 may be mounted at other positions as well.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics on the wearer's view of the real world. The display 158 is shown to be provided in a center of a lens of the HMD 152, however, the display 158 may be provided in other positions. The display 158 is controllable via the computing system 154 that is coupled to the display 158 via an optical waveguide 160.

Figure 1D:
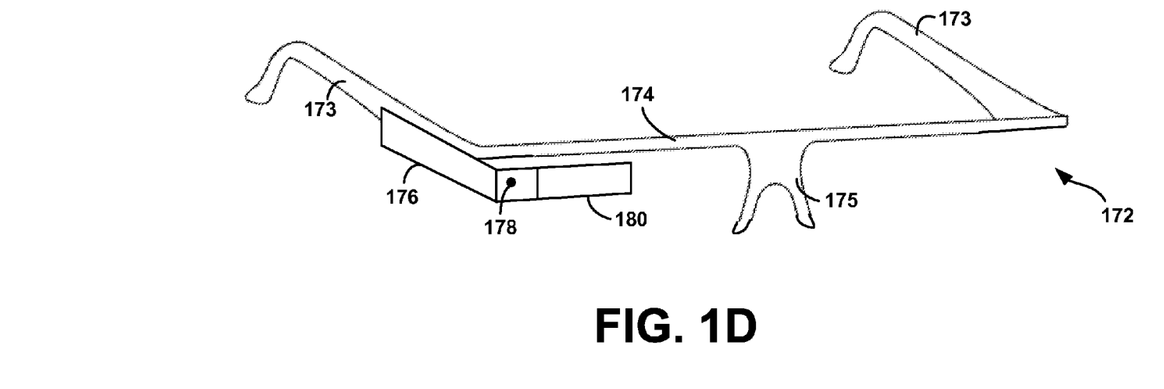
FIG. 1D illustrates another wearable computing system according to an exemplary embodiment.

FIG. 1D illustrates another wearable computing system according to an exemplary embodiment, which takes the form of an HMD 172. The HMD 172 may include side-arms 173, a center frame support 174, and a bridge portion with nosepiece 175. In the example shown in FIG. 1D, the center frame support 174 connects the side-arms 173. The HMD 172 may additionally include an on-board computing system 176 and a camera 178, such as those described with respect to FIGS. 1A and 1B.

The HMD 172 may include a single lens element 180 that may be coupled to one of the side-arms 173 or the center frame support 174. In one example, the lens element 180 may be coupled to the inner side (i.e., the side exposed to a portion of a wearer's head) of the extending side-arm 173. The lens element 180 may be positioned in front of or proximate to a wearer's eye. For example, the single lens element 180 may be positioned below the center frame support 174, as shown in FIG. 1D.

The lens element 180 may act as or include a display as described above in connection with the lens 110, 112 and/or the display 158, and may be configured to overlay computer-generated graphics in the wearer's view of the real world. As such, the lens element 180 or a portion thereof may also be referred to as a display 180.

III. Example Operations

Figure 2:
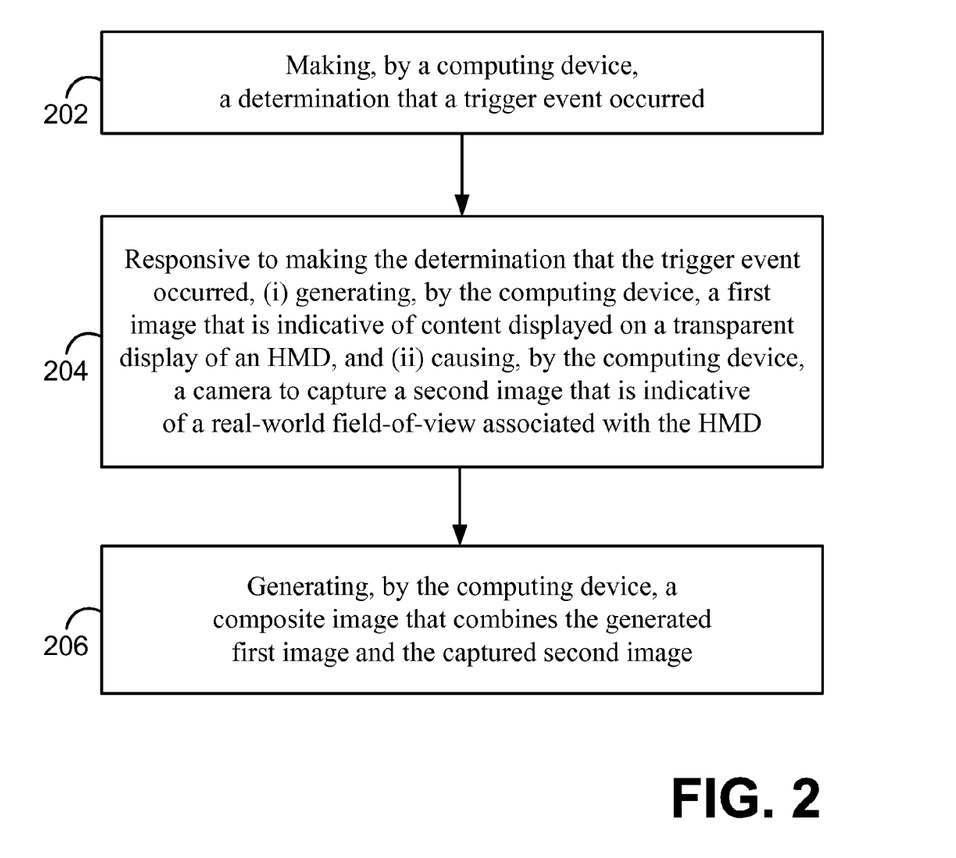
FIG. 2 is a flowchart showing functions of the disclosed method according to an exemplary embodiment.

FIG. 2 is a flowchart showing functions of the disclosed method according to an exemplary embodiment. At block 202, the method may involve making, by a computing device, a determination that a trigger event occurred. For instance, at block 202 the method may involve the HMD 172 making a determination that a trigger event occurred. A trigger event may take a variety of forms. For example, a trigger event may involve a gesture being made, a voice command being spoken, or a button being pressed as described above. Other types of trigger events are also possible.

Figure 3:
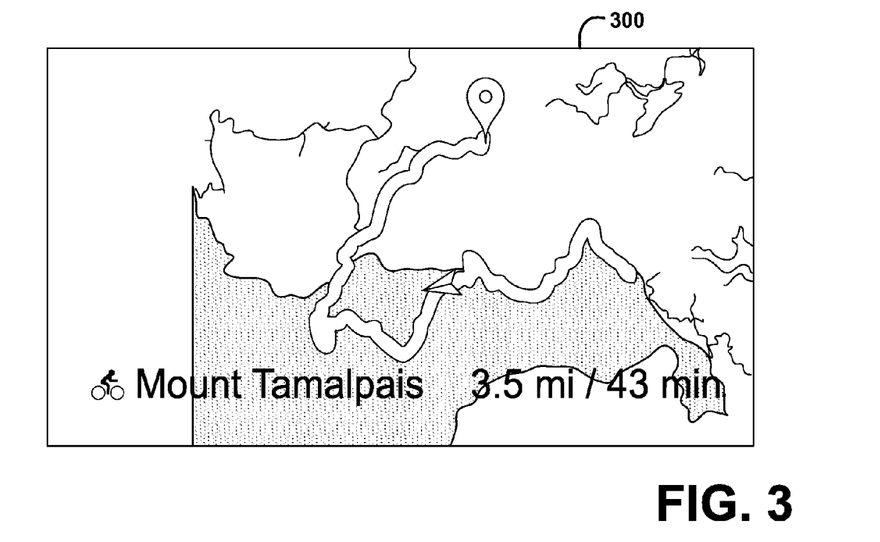
FIG. 3 illustrates a generated image according to an exemplary embodiment.
Figure 4:
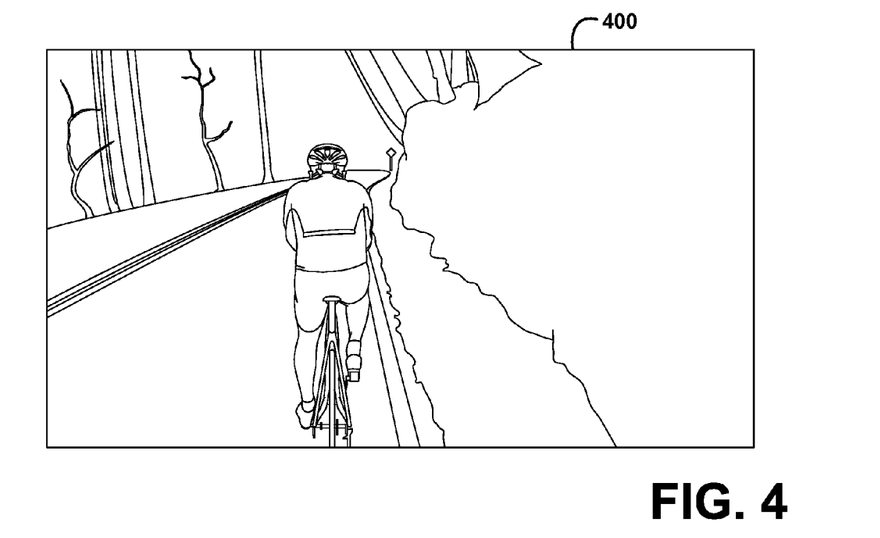
FIG. 4 illustrates a captured image according to an exemplary embodiment.

At block 204, the method may involve responsive to making the determination that the trigger event occurred, (i) generating, by the computing device, a first image that is indicative of content displayed on a display of an HMD, and (ii) causing, by the computing device, a camera to capture a second image that is indicative of a real-world field-of-view associated with the HMD. For instance, at block 204 the method may involve responsive to the HMD 172 making the determination that the trigger event occurred, (i) the HMD 172 generating a first image 300 (FIG. 3) that is indicative of content displayed on the display 180, and (ii) the HMD 172 causing the camera 178 to capture a second image 400

(FIG. 4) that is indicative of a real-world field-of-view associated with the HMD 172.

In one example, the generated first image 300 may be a screenshot of content displayed on the display 180. As such, the generated first image 300 may reflect the content exactly as presented on the display 180 (with the same size, position, orientation, etc.). Note that in the instance where the display 180 is transparent, the generated first image may include black portions to represent the absence of content. However, for clarity the generated first image 300 does not show such black portions. Also, it should be noted that other representations of an absence of content are possible.

In another example, the generated first image may be a modified version of the content displayed on the display 180. For instance, the generated first image may include content that has been relocated to a position different from its position on the display 180. As yet another example, some of the content shown on the display 180 may be omitted from the generated first image or modified with varying sizes, colors, styles, etc.

As noted above, the HMD 172 may cause the camera 178 to capture a second image 400 that is indicative of a real-world field-of-view associated with the HMD 172. In one example, the camera 178 is a front facing camera and is positioned such that the captured second image 400 may substantially represent the real-world field-of-view seen through and/or around the display 180 by the wearer.

In one example, responsive to the HMD 172 making the determination that the trigger event occurred, the HMD 172 may generate the first image 300 and cause the camera to capture the second image 400 substantially simultaneously (i.e., at or about the same time). This may ensure that the generated first image 300 and the captured second image 400 represent different portions of a wearer's view at a particular moment.

In some instances, the HMD 172 may be configured to display on the display 180 an effect (e.g., an animation of a shutter closing) proximate the time that an image is captured. As such, in an embodiment where the generated first image 300 is a screenshot of the display 180, it may be desired to generate the first image 300 before capturing the second image 400 such that the effect is not made part of the captured second image. Still, to ensure that the generated first image 300 and the captured second image 400 represent different portions of a wearer's view at or about the same moment, it may be desired to capture the second image 400 shortly after (e.g., less than one second after) generating the first image 300.

In addition, it may be desirable for the HMD 172 to initiate the function of generating the first image 300 before the HMD 172 initiates the function of capturing the second image 400 since it may take longer for the HMD to perform the first function than the second function. Accordingly, the HMD 172 generating the first image 300 and substantially simultaneously causing the camera to capture the second image 400 may involve the HMD 172 generating the first image 300 and, after the HMD 172 generates the first image 300, causing the camera to capture the second image 400.

At block 206, the method may involve generating, by the computing device, a composite image that combines the generated first image and the captured second image. For instance, the function at block 206 may involve the HMD 172 generating a composite image 500 (FIG. 5) that combines the generated first image 300 and the captured second image 400.

Figure 5:
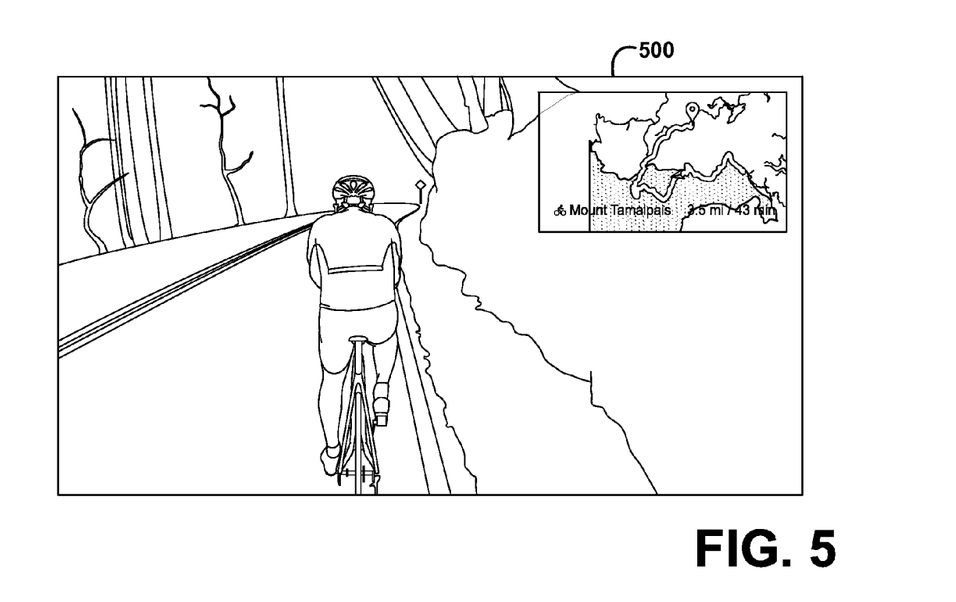
FIG. 5 illustrates a generated composite image according to an exemplary embodiment.
Figure 6:
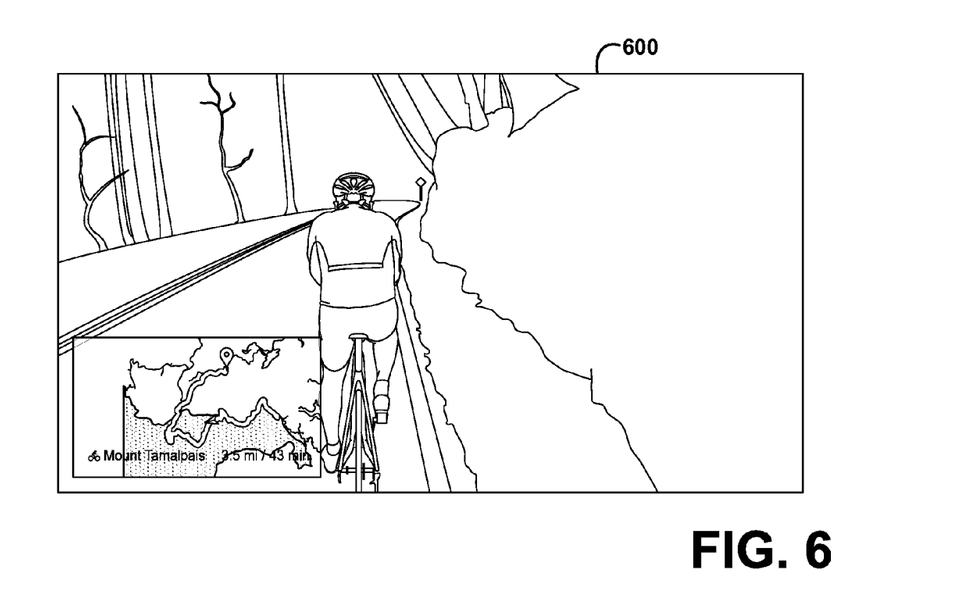
FIG. 6 illustrates another generated composite image according to an exemplary embodiment.

In one example, the HMD 172 may generate the composite image 500 by overlaying the generated first image 300 on the captured second image 400. In some instances, the generated composite image 500 may combine not only the generated first image 300 and the captured second image 400, but also another image, such as an effect image (e.g., a glass-texture effect-image). In this instance the HMD 172 may generate the composite image 500 by overlaying the generated first image 300 on the effect image and overlaying the effect image on the captured second image 400. Use of an effect image may further improve the generated composite image's representation of the wearer's view. Also, notably, the black portions in the generated first image as discussed above may be removed when generating the composite image.

Further, in generating the composite image, the HMD 172 may align the generated first image 300 with the captured second image 400 such that the generated composite image 500 is indicative of a view of a wearer of the HMD 172 proximate the time the trigger event occurred. In some instances, the HMD 172 may use eye-sensing technology to determine the particular direction in which the wearer is looking when the trigger event occurs. Alternatively or additionally, the HMD 172 may use sensor data (e.g., accelerometer data that may indicate whether the wearer is leaning is his head) to determine the particular direction in which the wearer is looking when the trigger event occurs. The HMD 172 may then align the generated first image 300 with the captured second image 400 based on this direction. In addition, the HMD 172 may 172 add a blurring effect to one or more portions of the generated composite image 500 based on this direction (i.e., to represent the wearer's focus).

In some instances, the HMD 172 may generate the composite image 500 in response to making the determination that the trigger event occurred. The HMD 172 may then display the generated composite image 500 on the display 180, and initiate one or more actions related to the generated composite image (e.g., based on a request from the wearer). For instance, the HMD may save or share the generated composite image with another user or device. In one example, the HMD 172 may save or share the generated composite image in response to the HMD 172 making a determination that a trigger event occurred. As described above, a trigger event may take a variety of forms. As such, a wearer of the HMD 172 may cause the HMD 172 to share a composite image by uttering a particular voice command, for instance. The HMD 172 may share the composite image in a variety of ways, such as by email or multimedia messaging service (MMS), or via a social media service.

Additionally or alternatively, the HMD 172 may store the generated first image 300 as metadata associated with the captured second image 400. Accordingly, the HMD 172 (or another computing device) may generate the composite image 500 at a later time (e.g. based on a request from a user). This may allow a user to browse images captured by the camera 178, and cause corresponding composite images to be generated as desired.

As noted above, the generated first image may not be an exact screenshot of the display 180. Indeed, the generated first image may include a modified version of the content on the display 180. In some instances, the HMD 172 may determine this modified version based on the captured second image. For example, where a portion of the generated first image aligns with a portion of the captured second image in such a way that the two portions could be difficult to distinguish if a composite image were generated (e.g., where red text would be overlaid on a red background), the HMD 172 may reposition that text to another position in the generated first image (and therefore in the generated composite image) to address this. FIG. 5 shows an example of an alternate generated composite image 500 (as compared to the generated composite image 400) where such content is repositioned.

Notably, FIGS. 3-6 illustrate one example set of images that may be generated and/or captured in connection with an example of the disclosed method, and are not meant to be limiting. Indeed, while the generated first image 300 depicts a map, the generated first image may depict anything that is indicative of content displayed on a display of an HMD. Further, while the captured second image 400 depicts a cyclist's field-of-view as provided through the display 180 of the HMD 172, the captured second image may depict any real-world field-of-view associated with an HMD. Likewise, the composite image that is generated based, at least in part, on the generated first image and the captured second image, is not limited to one of the example generated composite images 500, 600, but instead may vary depending on the generated first image and/or the captured second image as discussed above.

Figure 7:
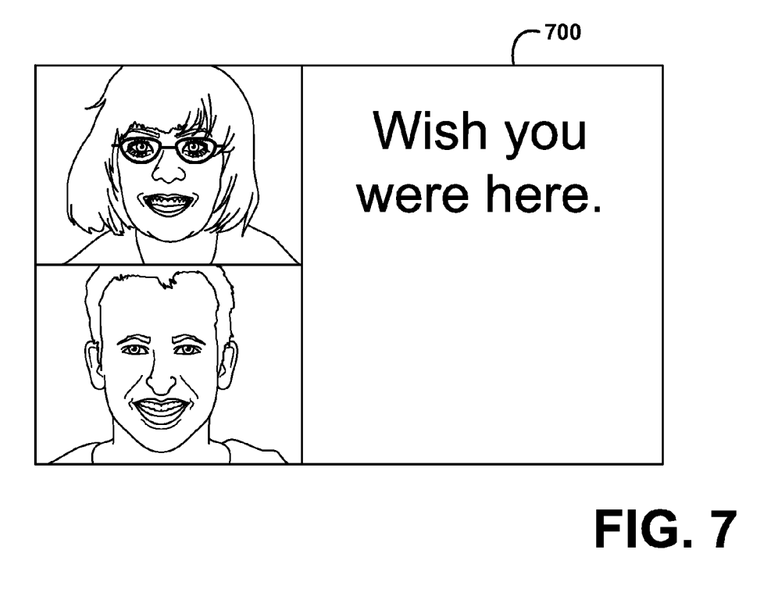
FIG. 7 illustrates another generated image according to an exemplary embodiment.
Figure 8:
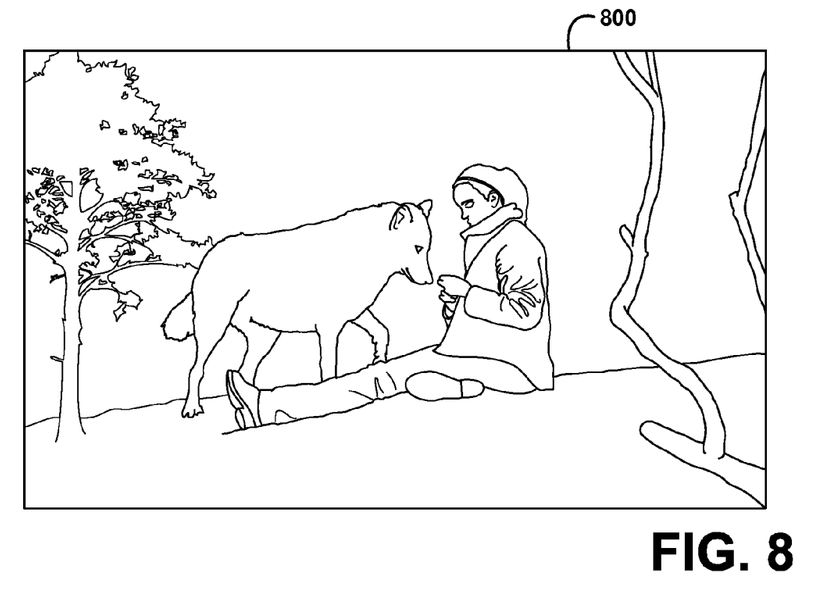
FIG. 8 illustrates another captured image according to an exemplary embodiment.
Figure 9:
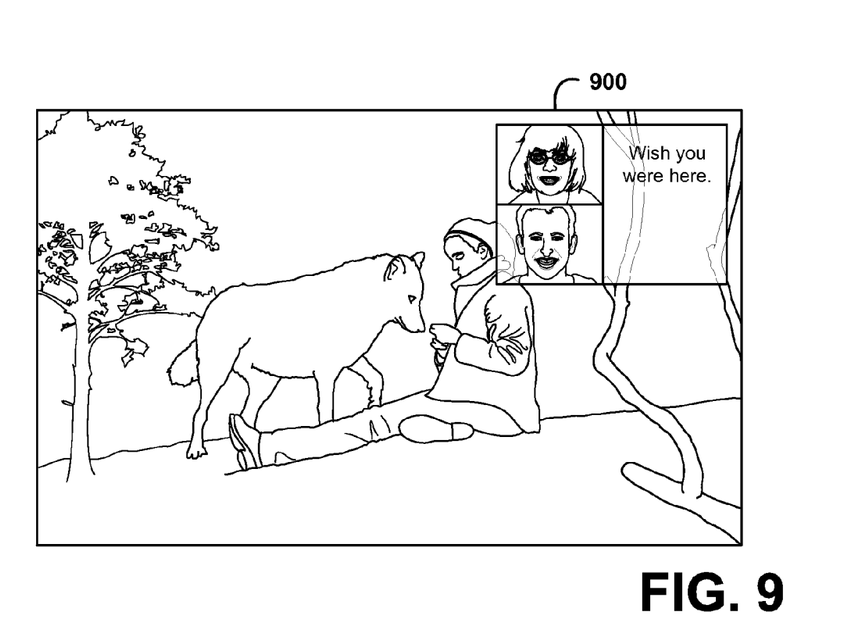
FIG. 9 illustrates another generated composite image according to an exemplary embodiment.
Figure 10:
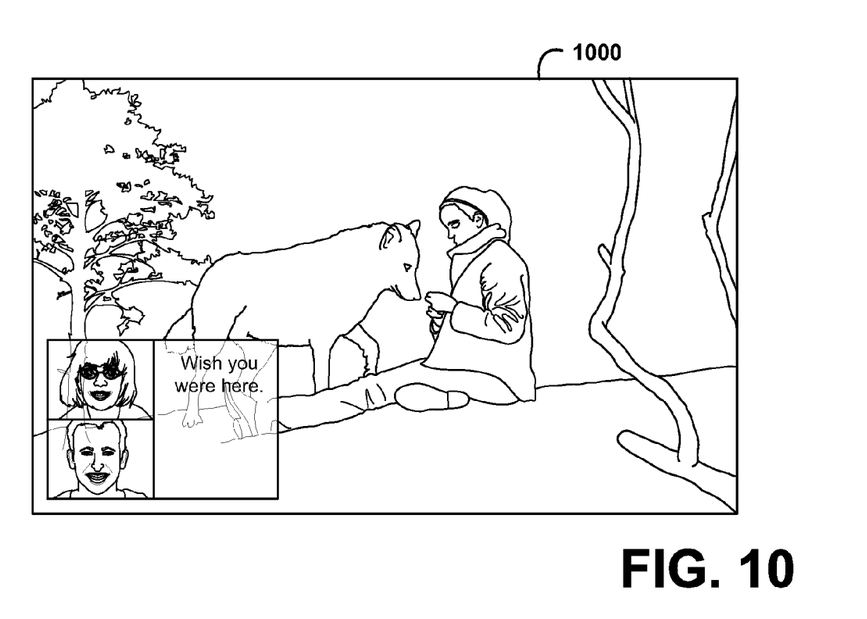
FIG. 10 illustrates another generated composite image according to an exemplary embodiment.

FIGS. 7-10 illustrate an alternative example set of images that may be generated and/or captured in connection with an example of the disclosed method. In particular, FIG. 7 illustrates a generated first image 700 that depicts a message "Wish you were here" sent by the wearer to a third party, along with facial images representing the wearer and the third party. FIG. 8 illustrates a captured second image 800 that depicts the wearer's field-of-view as provided through the display 180 of the HMD 172 while the wearer is in an outdoor setting. FIG. 9 illustrates a composite image 900 that overlays the generated first image 700 on the captured second image 800 (with the former being generally positioned over the upper right-hand corner of the latter). Finally, FIG. 10 illustrates a composite image 1000 that overlays the generated first image 700 on the captured second image 800 (with the former being generally positioned over the lower left-hand corner of the latter).

In some instances, the generated first image may include additional information not displayed on the display 180. For instance, the generated first image may include an indication of data relating to the HMD's operation proximate a time that the determination is made. Such data may take a variety of forms. For example, the data may take the form of audio data indicative of audio being played by the HMD 172 proximate a time that the trigger event occurred. Such audio data may include, for example, a song title, or perhaps a link to an online store that sells the song. As another example, the data may take the form of environmental data indicative of the environment in which the HMD 172 is operating proximate a time that the determination is made. Such environmental data may include, for example, a temperature of the environment in which the HMD 172 is in. As still another example, the data may include diagnostic or state data related to the HMD 172 (e.g., the current battery level), or data from an application running on the HMD 172. Other types of data are possible as well.

As such, in one example, responsive to the HMD 172 making the determination that the trigger event occurred, the method may involve the HMD 172 determining data relating to the HMD's operation proximate a time that the trigger event occurred. Further, the method may involve the HMD 172 generating a composite image that combines the generated first image, the captured second image, and an indication of the determined data. Notably, as with the generated first image, the HMD 172 may store the data as metadata associated with the captured second image such that a corresponding composite image may be generated at a later time.

Figure 11:
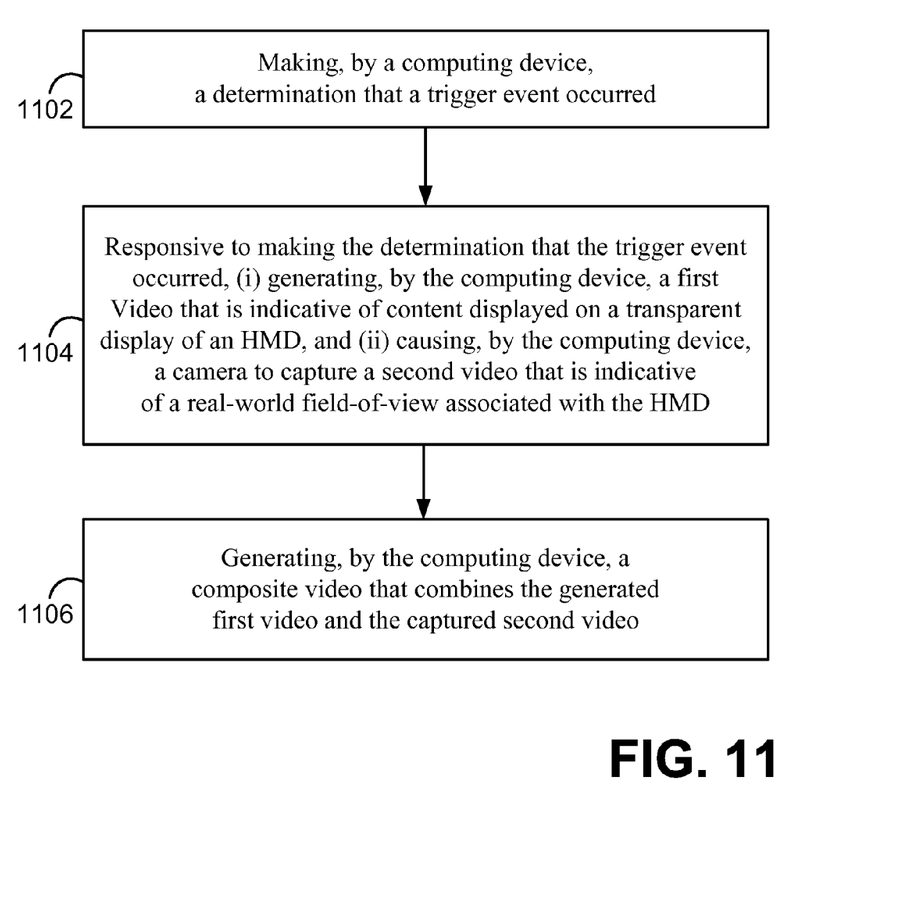
FIG. 11 is a flowchart showing functions of the disclosed method according to an exemplary embodiment.

FIG. 11 is a flowchart showing functions of the disclosed method according to another exemplary embodiment. The embodiment discussed in connection with FIG. 11 is the same as the embodiment discussed in connection with FIG. 2, except that it involves generating and capturing video (which may or may not include an audio portion), rather than an image.

As such, at block 1102, the method may involve making, by a computing device, a determination that a trigger event occurred. For instance, at block 1102 the method may involve the HMD 172 making a determination that a trigger event occurred.

At block 1104, the method may involve responsive to making the determination that the trigger event occurred, (i) generating, by the computing device, a first video that is indicative of content displayed on a display of an HMD, and (ii) causing, by the computing device, a camera to capture a second video that is indicative of a real-world field-of-view associated with the HMD. For instance, at block 1104 the method may involve responsive to the HMD 172 making the determination that the trigger event occurred, (i) the HMD 172 generating a first video that is indicative of content displayed on the display 180, and (ii) the HMD 172 causing the camera 178 to capture a second video that is indicative of a real-world field-of-view associated with the HMD 172.

At block 1106, the method may involve generating, by the computing device, a composite video that combines the generated first video and the captured second video. For instance, the function at block 1106 may involve the HMD 172 generating a composite video that combines the generated first video and the captured second video.

Notably, since (unlike an image) video has some duration, the functions of the HMD 172 recording and/or capturing video may involve the HMD 172 initiating the functions of recording and/or capturing video. The HMD 172 may then terminate those functions at a later time (e.g., in response to another trigger event occurring).

Also, it should be noted that each of the features described in connection with the embodiment of FIG. 2 are also applicable to the embodiment of FIG. 11, except that they may be adapted as appropriate for video rather than an image. For instance, the generating first video may be a video-based screenshot of content displayed on the display 180 (i.e., rather than an image screenshot).

IV. Conclusion

While one or more functions have been described as being performed by certain devices or entities (e.g., the HMD 172), the functions may be performed by any device or entity, such as those described above. Also, the functions need not be performed in the disclosed order, although in some examples, an order may be preferred. And not all functions need to be performed to achieve the desired advantages of the disclosed system and method, and therefore not all functions are required.

It should also be noted that the variations described in connection with select examples of the disclosed system and method may be applied to all other examples of the disclosed system or method. And throughout this application, unless otherwise specified and/or unless the particular context clearly dictates otherwise, each usage of "a" or "an" means at least one, and each usage of "the" means the at least one.

Further, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
    displaying content on a transparent or semi-transparent display of a head-mountable device (HMD), wherein the displayed content is perceived by a wearer of the HMD as being superimposed over a real-world field-of-view seen through the transparent or semi-transparent display;
    making, by the HMD, a determination that a trigger event occurred;
    responsive to making the determination that the trigger event occurred, both: (i) generating, by the HMD, a first image of the displayed content, and (ii) causing, by the HMD, a camera to capture a second image of the real-world field-of-view associated with the HMD; and
    generating, by the HMD, a composite image that combines the generated first image, the captured second image, and an effect image by overlaying the generated first image on the effect image and overlaying the effect image on the captured second image, wherein the effect image improves the accuracy of the generated composite image's representation of the wearer's view, and wherein the effect image is neither displayed on the display of the HMD nor part of the real-world field-of-view associated with the HMD.

2. The method of claim 1, wherein the trigger event comprises at least one event from a group of events comprising: a gesture being made, a voice command being spoken, and a button being pressed.

3. The method of claim 1, wherein responsive to making the determination that the trigger event occurred, (i) generating, by the HMD, the first image, and (ii) causing, by the HMD, the camera to capture the second image comprises responsive to making the determination, substantially simultaneously (i) generating, by the HMD, the first image, and (ii) causing, by the HMD, the camera to capture the second image.

4. The method of claim 3, wherein causing, by the HMD, the camera to capture the second image causes the HMD to, proximate a time that the camera captures the second image, display a visual effect on the display for a duration.

5. The method of claim 1, wherein the generated first image comprises a screenshot of content displayed on the display.

6. The method of claim 1, wherein the generated first image comprises a modified version of a screenshot of content displayed on the display.

7. The method of claim 1, wherein in the generated composite image, the generated first image is aligned with the captured second image such that the generated composite image is indicative of a view of a user wearing the HMD proximate a time that the trigger event occurred.

8. The method of claim 1, wherein the effect image comprises a glass-texture effect.

9. The method of claim 1, wherein the generating the composite image occurs in response to making the determination.

10. The method of claim 1, further comprising:
    responsive to making the determination that the trigger event occurred, determining, by the HMD, data relating to the HMD's operation proximate a time that the trigger event occurred, wherein the generated composite image further includes an indication of the determined data.

11. The method of claim 10, wherein the data comprises audio data indicative of audio being played by the HMD proximate a time that the trigger event occurred.

12. The method of claim 10, wherein the data comprises environmental data indicative of the environment in which the HMD is operating proximate a time that the trigger event occurred.

13. The method of claim 10, wherein the data comprises diagnostic or state data related to the HMD proximate a time that the trigger event occurred.

14. The method of claim 1, further comprising displaying on the display the generated composite image.

15. The method of claim 1, wherein the display comprises a transparent display.

16. A head-mountable device (HMD) comprising:
    a transparent or semi-transparent display;
    a camera positioned for capturing a real-world field-of-view associated with the HMD;
    a processor; and
    a non-transitory computer-readable medium including program instructions that, when executed by the processor, cause performance of a set of functions comprising:
        displaying content on the transparent or semi-transparent display, wherein the displayed content is perceived by a wearer of the HMD as being superimposed over the real-world field-of-view seen through the transparent or semi-transparent display;
        making a determination that a trigger event occurred;
        responsive to making the determination that the trigger event occurred, (i) generating a first image of the displayed content, and (ii) causing the camera to capture a second image of the real-world field-of-view; and
        generating, by the HMD, a composite image that combines the generated first image, the captured second image, and an effect image by overlaying the generated first image on the effect image and overlaying the effect image on the captured second image, wherein the effect image improves the accuracy of the generated composite image's representation of the wearer's view, and wherein the effect image is neither displayed on the display of the HMD nor part of the real-world field-of-view associated with the HMD.

17. The HMD of claim 16, wherein responsive to making the determination that the trigger event occurred, (i) generating the first image, and (ii) causing the camera to capture the second image comprises responsive to making the determination that the trigger event occurred, substantially simultaneously (i) generating the first image, and (ii) causing the camera to capture the second image.

18. The HMD of claim 16, wherein the generated first image comprises a screenshot of content displayed on the display.

19. The HMD of claim 16, the set of functions further comprising:
    responsive to making the determination that the trigger event occurred, determining, by the HMD, data relating to the HMD's operation proximate a time that the trigger event occurred, wherein the generated composite image further includes an indication of the determined data.

20. A non-transitory computer-readable medium having stored thereon, program instructions that when executed by a processor, cause performance of a set of acts comprising:
- displaying content on a transparent or semi-transparent display of a head-mountable device (HMD), wherein the displayed content is perceived by a wearer of the HMD as being superimposed over a real-world field-of-view seen through the transparent or semi-transparent display;
- making, by the HMD, a determination that a trigger event occurred;
- responsive to making the determination that the trigger event occurred, both: (i) generating, by the HMD, a first image of the displayed content, and (ii) causing, by the HMD, a camera to capture a second image of the real-world field-of-view associated with the HMD; and
- generating, by the HMD, a composite image that combines the generated first image, the captured second image, and a glass-texture effect image by overlaying the generated first image on the glass-texture effect image and overlaying the glass-texture effect image on the captured second image, wherein the glass-texture effect image is neither displayed on the display of the HMD nor part of the real-world field-of-view associated with the HMD.

* * * * *